US009234452B2

(12) United States Patent
Stockner et al.

(10) Patent No.: US 9,234,452 B2
(45) Date of Patent: Jan. 12, 2016

(54) DIRECT INJECTION GAS ENGINE AND METHOD

(75) Inventors: Alan R. Stockner, Metamora, IL (US); Frank J. Lombardi, Metamora, IL (US)

(73) Assignee: Caterpillar Inc., Peoria, IL (US)

( * ) Notice: Subject to any disclaimer, the term of this patent is extended or adjusted under 35 U.S.C. 154(b) by 861 days.

(21) Appl. No.: 13/474,079

(22) Filed: May 17, 2012

(65) Prior Publication Data

US 2013/0311067 A1 Nov. 21, 2013

(51) Int. Cl.

| | |
|---|---|
| F02B 27/02 | (2006.01) |
| F02B 45/10 | (2006.01) |
| F02M 21/02 | (2006.01) |
| F02D 19/08 | (2006.01) |
| F02D 19/02 | (2006.01) |
| F02D 19/06 | (2006.01) |
| F02D 19/10 | (2006.01) |
| F02D 41/22 | (2006.01) |
| F02M 63/02 | (2006.01) |
| F02M 43/00 | (2006.01) |
| F02M 37/04 | (2006.01) |
| F02D 41/00 | (2006.01) |

(52) U.S. Cl.
CPC ................. *F02B 27/02* (2013.01); *F02B 45/10* (2013.01); *F02D 19/027* (2013.01); *F02D 19/0623* (2013.01); *F02D 19/0684* (2013.01); *F02D 19/0694* (2013.01); *F02D 19/08* (2013.01); *F02D 19/105* (2013.01); *F02D 41/0027* (2013.01); *F02D 41/22* (2013.01); *F02M 21/02* (2013.01); *F02M 43/00* (2013.01); *F02M 63/029* (2013.01); *F02D 19/0689* (2013.01); *F02D 41/0025* (2013.01); *F02D 2041/227* (2013.01); *F02M 21/0215* (2013.01); *F02M 21/0224* (2013.01); *F02M 37/04* (2013.01); *Y02T 10/32* (2013.01); *Y02T 10/36* (2013.01); *Y02T 10/40* (2013.01)

(58) Field of Classification Search
CPC ....... F02B 27/02; F02B 45/10; F02M 63/029; F02M 43/00; F02M 21/02; F02M 37/04; F02D 41/0025; F02D 41/0027; F02D 41/22; F02D 19/0623; F02D 19/027; F02D 19/105; F02D 19/0684; F02D 19/0689; F02D 19/0694; F02D 19/08; F02D 2041/227; Y02T 10/32; Y02T 10/36; Y02T 10/40

See application file for complete search history.

(56) References Cited

U.S. PATENT DOCUMENTS

| | | | |
|---|---|---|---|
| 5,188,519 A | | 2/1993 | Spulgis |
| 5,499,615 A | * | 3/1996 | Lawrence et al. ............. 123/526 |

(Continued)

FOREIGN PATENT DOCUMENTS

| | | |
|---|---|---|
| CA | 2523732 A1 | 4/2006 |
| EP | 1570163 B1 | 8/2006 |
| WO | WO 2007/056845 A1 | 5/2007 |

*Primary Examiner* — Hieu T Vo
*Assistant Examiner* — Sherman Manley
(74) *Attorney, Agent, or Firm* — Leydig, Voit & Mayer, Ltd.

(57) ABSTRACT

The disclosure describes an engine system having liquid and gaseous fuel systems, each of which injects fuel directly into an engine cylinder. A controller monitors and controls engine operation in a normal mode, during which the engine produces rated power, and in a limp-home mode, which is used when an abnormal operating condition of the gaseous fuel system is present. During limp-home mode operation, the engine uses more liquid fuel and less or no gaseous fuel relative to the normal mode, and produces power that is less than rated power.

14 Claims, 7 Drawing Sheets

(56) References Cited

U.S. PATENT DOCUMENTS

| | | | |
|---|---|---|---|
| 5,810,570 A | 9/1998 | Nguyen | |
| 6,003,478 A | 12/1999 | Huber | |
| 6,035,837 A | 3/2000 | Cohen et al. | |
| 6,073,592 A | 6/2000 | Brown et al. | |
| 6,283,720 B1 | 9/2001 | Kottke | |
| 6,314,948 B1 * | 11/2001 | Cathcart | 123/533 |
| 6,435,165 B1 * | 8/2002 | Hill et al. | 123/531 |
| 6,530,761 B1 | 3/2003 | Chalk et al. | |
| 6,543,395 B2 | 4/2003 | Green | |
| 6,575,147 B2 | 6/2003 | Wulff et al. | |
| 6,589,027 B2 | 7/2003 | Ursan et al. | |
| 6,663,350 B2 | 12/2003 | Tyree, Jr. | |
| 6,679,233 B1 * | 1/2004 | Melbourne | 123/533 |
| 6,694,242 B2 | 2/2004 | Wong | |
| 6,845,746 B2 * | 1/2005 | Hilger et al. | 123/298 |
| 6,898,940 B2 | 5/2005 | Gram et al. | |
| 6,907,870 B2 | 6/2005 | zur Loye et al. | |
| 6,912,992 B2 | 7/2005 | Ancimer et al. | |
| 6,959,693 B2 | 11/2005 | Oda | |
| 7,144,228 B2 | 12/2006 | Emmer et al. | |
| 7,223,080 B2 | 5/2007 | Duron | |
| 7,284,506 B1 | 10/2007 | Sun et al. | |
| 7,410,348 B2 | 8/2008 | Chalk et al. | |
| 7,509,209 B2 | 3/2009 | Davis et al. | |
| 7,627,416 B2 | 12/2009 | Batenburg et al. | |
| 7,628,137 B1 * | 12/2009 | McAlister | 123/297 |
| 7,684,925 B2 | 3/2010 | Kuo et al. | |
| 7,913,673 B2 | 3/2011 | Vanderslice et al. | |
| 7,957,888 B2 | 6/2011 | Leone et al. | |
| 2002/0166515 A1 * | 11/2002 | Ancimer et al. | 123/27 R |
| 2010/0147262 A1 | 6/2010 | Martin et al. | |
| 2014/0182551 A1 * | 7/2014 | Steffen | 123/446 |
| 2014/0182559 A1 * | 7/2014 | Steffen et al. | 123/478 |

* cited by examiner

DIRECT INJECTION GAS ENGINE AND METHOD

TECHNICAL FIELD

This patent disclosure relates generally to internal combustion engines and, more particularly, to an emergency or limp-home operating mode of direct injection diesel and direct injection gas engines.

BACKGROUND

There are various different types of engines that use more than one fuel. One type is known as a direct injection gas (DIG) engine, in which a gaseous fuel, such as LPG, is injected into the cylinder at high pressure while combustion in the cylinder from a diesel pilot is already underway. DIG engines operate on the gaseous fuel, and the diesel pilot provides ignition of the gaseous fuel. Another type of engine that uses more than one fuel is typically referred to as a dual-fuel engine, which uses a low-pressure gaseous fuel such as natural gas that is mixed at relatively low pressure with intake air admitted into the engine cylinders. Dual-fuel engines are typically configured to operate with liquid fuel such as diesel or gasoline at full power. The gaseous fuel is provided to displace a quantity of liquid fuel during steady state operation. The air/gaseous fuel mixture that is provided to the cylinder under certain operating conditions is compressed and then ignited using a spark, similar to gasoline engines, or using a compression ignition fuel, such as diesel, which is injected into the air/gaseous fuel mixture present in the cylinder.

When one of the fuel delivery systems in a dual fuel engine malfunctions, for example, when the gaseous fuel supply is unable to provide a sufficient amount of gaseous fuel, the engine adjusts its operation with various degrees of difficulty depending on the type of engine. For example, adjusting engine operation in dual-fuel engines, in which the gaseous fuel supply is at low pressure, is relatively easy because these engines are already configured to operate normally without gaseous fuel. Thus, in the event a malfunction of the engine prevents the supply of the gaseous fuel from reaching the cylinder, the engine merely continues to operate on the liquid fuel.

One example of such an engine configuration can be found in U.S. Pat. No. 6,694,242, which was issued on Feb. 17, 2004. In this example, an engine includes two controllers, one controlling engine operation in a dual fuel mode, and the other to control operation in a single, liquid fuel mode. The engine is configured to operate in diesel only mode under the command of the single-fuel controller. Operation under dual-fuel mode occurs under the control of the second controller. When operating in this mode, gaseous fuel is provided at a low pressure in mixing relation with air entering an engine cylinder, where it is compressed before diesel injected into the cylinder initiates combustion. As can be appreciated, the engine's ability to operate in diesel-only mode allows the engine to transition to this operating mode when, for example, a failure in the gaseous fuel delivery system has been detected.

Another example of dual-fuel engine having a fuel supply that displaces liquid fuel during engine operation can be seen in International Publication No. WO 2007/056845 A1, which published on May 24, 2007. In this example, a gaseous fuel delivery system is designed for retrofit onto existing diesel engines, and includes a gaseous fuel injector installed into an existing glow plug opening of the engine. Gaseous fuel is injected directly into the engine cylinder, as does the existing diesel injector. Combustion is accomplished by preconditioning the air entering the cylinder by use of a heater, which elevates the incoming air temperature to create conditions favorable for gaseous fuel combustion. The engine can operate on both fuels or, with the aid of the heater, in either gaseous fuel-only or diesel fuel-only operation.

Although engines using more than one fuel are known, these engines use the gaseous fuel to displace an amount of liquid fuel such as diesel under certain operating modes. Thus, these engines are capable of operating without any gaseous fuel when a malfunction of the gaseous fuel is detected.

However, this is not the case for DIG engines, in which the main fuel is the gaseous fuel and the secondary liquid fuel, for example, diesel, is used to initiate combustion as previously described. In these engines, a failure of the gaseous fuel system will immobilize the engine and thus the vehicle in which it is installed, because the gaseous fuel is the main fuel supply for the engine and the liquid fuel is merely used as an ignition source. Such immobilization is especially undesired when the engine is installed in large equipment, such as mining trucks, because a single immobilized truck in a fleet can halt an entire mining operation. For example, in mines where roadways to and from a dig site are carved as the dig site moves, a single lane for traffic is typically cut, often at an appreciable grade. A fully loaded truck stranded onto one of these steep roadways will create delays for other trucks entering or leaving the dig site, which will create a hazardous traffic condition and generate long delays and increased costs in the extraction operations of the mine.

SUMMARY

The disclosure describes, in one aspect, a direct injection gas (DIG) engine system. The DIG engine system includes an engine having at least one cylinder that forms a variable volume between a reciprocable piston, a bore, and a flame deck. A liquid fuel system includes a liquid fuel rail in fluid communication with a liquid fuel injector, which is configured to inject liquid fuel directly into the variable volume as an ignition source. A gaseous fuel system includes a gaseous fuel rail in fluid communication with a gaseous fuel injector, which is configured to inject gaseous fuel directly into the variable volume as a power source. A controller is disposed to monitor and control operation of the engine in a normal mode or in a limp-home mode.

In one embodiment, the normal mode is present when abnormal operating conditions of the system are absent, and the limp-home mode is present when the controller determines that abnormal operating conditions are present. When operating in the normal mode, a normal amount of liquid fuel and a normal amount of gaseous fuel are injected into the cylinder to produce a rated engine power. When operating in the limp-home mode, an amount of liquid fuel that is larger than the normal amount of liquid fuel and an amount of gaseous fuel that is less than the normal amount of gaseous fuel are injected into the cylinder to produce a limp-home engine power that is less than the rated power but sufficient to continue operating the engine at a useful power output.

In another aspect, the disclosure describes a failure mitigation system for a direct injection gas (DIG) engine, which uses a diesel pilot to ignite a directly injected gaseous fuel such as liquefied petroleum or natural gas that is stored in a cryogenic tank and is heated for use in an engine. The system includes at least one engine cylinder that forms a variable volume between a piston, a bore, and a flame deck. A diesel fuel system includes a diesel fuel rail in fluid communication with a diesel fuel injector, which is configured to inject diesel fuel directly into the variable volume as an ignition source. A gaseous fuel system includes a gaseous fuel rail in fluid communication with a gaseous fuel injector, which is configured to inject gaseous fuel directly into the variable volume as a power source. The controller is disposed to monitor and control operation of the engine in a normal mode or in a limp-home mode.

In one embodiment, the normal mode is present when abnormal operating conditions are absent, and the limp-home mode is present when the controller determines that abnormal operating conditions are present. When operating in the normal mode, a normal amount of diesel fuel and a normal amount of gaseous fuel are injected into the cylinder to produce a rated engine power. When operating in the limp-home mode, an amount of diesel fuel that is larger than the normal amount of diesel fuel and an amount of gaseous fuel that is less than the normal amount of gaseous fuel are injected into the cylinder to produce a limp-home engine power that is less than the rated power.

In yet another aspect, the disclosure describes a method for mitigating gaseous fuel system failures or abnormal operating conditions in a direct injection gas (DIG) engine. The method includes operating a gaseous fuel supply system that includes a storage tank adapted to store a gaseous fuel in a cryogenically liquefied state, a gas pump adapted to draw gaseous fuel from the storage tank and compress it to produce compressed gaseous fuel, a heater adapted to increase an enthalpy of the compressed gaseous fuel, and a gaseous fuel rail adapted to collect the compressed gaseous fuel. A controller monitors sensor signals indicative of operating conditions of the gaseous fuel supply. The sensor signals include at least one of a rail state signal, which is indicative of the state of the compressed gaseous fuel in the gaseous fuel rail, a heater state signal, which is indicative of a gaseous fuel state at an outlet of the heater, a liquid state signal, which is indicative of a gaseous fuel state at an inlet of the heater, and a level signal, which is indicative of a level of the gaseous fuel in the cryogenically liquefied state within the storage tank. When the controller determines that an abnormal operating condition is present based on the monitoring of at least one of the rail state signal, the heater state signal, the liquid state signal and the level signal, it shifts engine operation from a normal mode to a limp-home mode while the abnormal operating condition is present. When operating in the normal mode, a normal amount of a liquid fuel and a normal amount of the gaseous fuel are injected into an engine cylinder to produce a rated engine power. When operating in the limp-home mode, an amount of liquid fuel that is larger than the normal amount of liquid fuel and an amount of gaseous fuel that is less than the normal amount of gaseous fuel are injected into the engine cylinder to produce a limp-home engine power that is less than the rated power.

DETAILED DESCRIPTION

Figure 1:
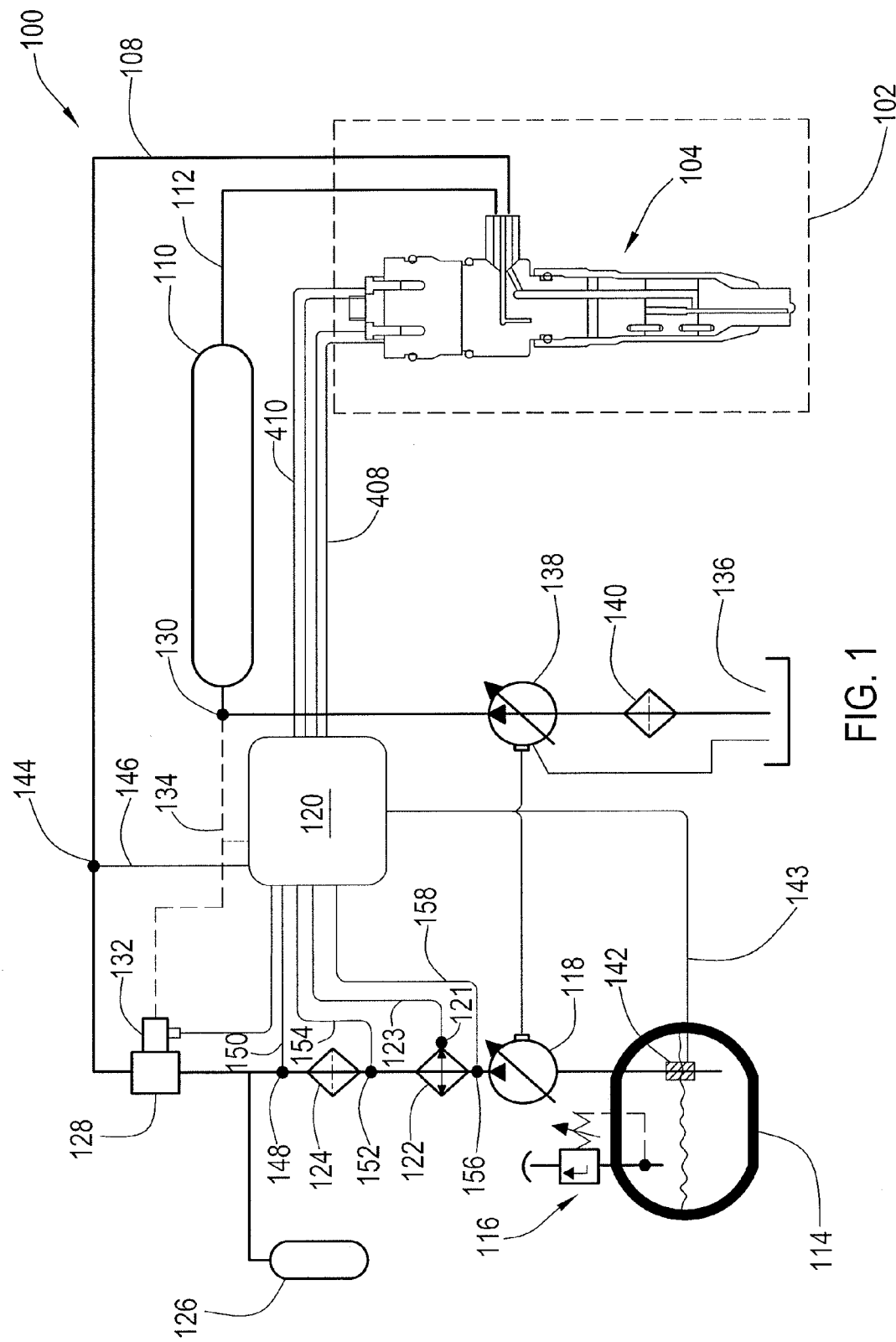
FIG. 1 is a block diagram of a direct injection gas (DIG) and liquid fuel system for an engine in accordance with the disclosure.

This disclosure relates to direct injection gas (DIG) engines using diesel ignition and, more particularly, to an engine control strategy and system for mitigating failures in the gas delivery system such that the engine can operate in a limp-home mode, even if a vehicle in which it is installed is fully loaded, such that the vehicle can retain mobility en route to a service or repair location. A block diagram of a DIG engine system 100 is shown in FIG. 1. The engine system 100 includes an engine 102 (shown generically in FIG. 1) having a fuel injector 104 associated with each engine cylinder (best shown in FIG. 2). The fuel injector 104 is a dual-check injector configured to independently inject predetermined amounts of two separate fuels.

The injector 104 is connected to a high-pressure gaseous fuel supply line 108 and to a high-pressure liquid fuel rail 110 via a liquid fuel supply line 112. In the illustrated embodiment, the gaseous fuel is natural or petroleum gas that is provided through the gaseous fuel supply line 108 at a pressure of between about 25-50 MPa, and the liquid fuel is diesel, which is maintained within the liquid fuel rail 110 at about 25-50 MPa, but any other pressures or types of fuels may be used depending on the operating conditions of each engine application. It is noted that although reference is made to the fuels present in the supply line 108 and the fuel rail 110 using the words "gaseous" or "liquid," these designations are not intended to limit the phase in which is fuel is present in the respective rail and are rather used solely for the sake of discussion. For example, the fuel provided at a controlled pressure within the gaseous fuel supply line 108, depending on the pressure at which it is maintained, may be in a liquid, gaseous or supercritical phase. Additionally, the liquid fuel can be any hydrocarbon based fuel; for example DME (Dimethyl Ether), biofuel, MDO (Marine Diesel Oil), or HFO (Heavy Fuel Oil).

Whether the system 100 is installed in a mobile or a stationary application, each of which is contemplated, the gaseous fuel may be stored in a liquid state in a cryogenic tank 114, which can be pressurized at a relatively low pressure, for example, atmospheric, or at a higher pressure. In the illustrated embodiment, the tank 114 is insulated to store liquefied natural gas (LNG) at a temperature of about −160° C. (−256° F.) and a pressure that is between about 100 and 1750 kPa, but other storage conditions may be used. The tank 114 further includes a pressure relief valve 116.

During operation, LNG from the tank is compressed, still in a liquid phase, in a pump 118, which raises the pressure of the LNG while maintaining the LNG in a liquid phase. The pump 118 is configured to selectively increase the pressure of the LNG to a pressure that can vary in response to a pressure command signal provided to the pump 118 from an electronic controller 120.

The compressed LNG is heated in a heat exchanger 122. The heat exchanger 122 provides heat to the compressed LNG to reduce density and viscosity while increasing its enthalpy and temperature. In one exemplary application, the LNG may enter the heat exchanger 122 at a temperature of about −160° C., a density of about 430 kg/m³, an enthalpy of about 70 kJ/kg, and a viscosity of about 169 μPa s as a liquid, and exit the heat exchanger at a temperature of about 50° C., a density of about 220 kg/m³, an enthalpy of about 760 kJ/kg, and a viscosity of about 28 μPa s. It should be appreciated that the values of such representative state parameters may be different depending on the particular composition of the fuel being used. In general, the fuel is expected to enter the heat exchanger in a cryogenic, liquid state, and exit the heat exchanger in a supercritical gas state, which is used herein to describe a state in which the fuel is gaseous but has a density that is between that of its vapor and liquid phases. The heat exchanger 122 may be any known type of heat exchanger or heater for use with LNG. In the illustrated embodiment, the heat exchanger 122 is a jacket water heater that extracts heat from engine coolant. A temperature sensor 121 is disposed to measure the temperature of engine coolant exiting the heat exchanger 122 and provide a temperature signal 123 to the controller 120.

Gas exiting the heat exchanger 122 is filtered at a filter 124. A portion of the filtered gas may be stored in a pressurized accumulator 126, and the remaining gas is provided to a pressure control module 128. Pressure-regulated gas is provided to the gaseous fuel supply line 108. The pressure control module 128 is responsive to a control signal from the electronic controller 120 and/or is configured to regulate the pressure of the gas provided to the fuel injector 104. The pressure control module 128 can be a mechanical device such as a dome loaded regulator or can alternatively be an electro-mechanically controlled device that is responsive to a command signal from the controller 120.

Liquid fuel, or in the illustrated embodiment diesel fuel, is stored in a fuel reservoir 136. From there, fuel is drawn into a variable displacement pump 138 through a filter 140 and at a variable rate depending on the operating mode of the engine. The rate of fuel provided by the pump 138 is controlled by the pump's variable displacement capability in response to a command signal from the electronic controller 120. Pressurized fuel from the pump 138 is provided to the liquid fuel rail 110.

The system 100 may include various other sensors providing information to the controller 120 relative to the operating state and overall health of the system. Relative to the gas system supply, the system engine system 100 includes a level indicator 142 associated with the tank 114 and disposed to measure a level of LNG present in the tank. The level indicator 142 provides a level signal 143 to the electronic controller 120 that is indicative of the level of LNG that remains within the tank 114.

The system 100 may include various other sensors that are indicative of the state of the gaseous fuel at various locations in the system. As used herein, gas state is meant to describe a parameter indicative of the thermodynamic state of the gaseous fuel, for example, the pressure and/or temperature of the fuel, as appropriate. When determining the state of the gas, the parameter of interest for purpose of diagnosing the health of the system depends on changes that may occur to the state of the gas. Accordingly, while pressure of the gas may be relevant to diagnosing the operation of a pump, the temperature of the gas may be more relevant to diagnose the operating state of a heat exchanger that heats the gas. In the description that follows, reference is made to "state" sensors, which should be understood to be any type of sensor that measures one or more state parameters of the gas, including but not limited to pressure, temperature, density and the like.

Accordingly, a gas state sensor 144 is disposed to measure and provide a rail state signal 146 indicative of a fluid state at the gas fuel supply line 108. The rail state signal 146 may be indicative of pressure and/or temperature of the gas. A state sensor 148 is disposed to measure and provide a filter state signal 150 indicative of the gas state between (downstream of) the gas filter 124 and (upstream of) the pressure control module 128. The filter state signal 150 may be indicative of gas pressure. An additional state sensor 152 is disposed to measure and provide a heater state signal 154 indicative of the gas state between the heat exchanger 122 and the gas filter 124. The heater state signal 154 may be indicative of gas temperature at that location. An additional state sensor 156 is disposed to measure and provide a liquid state signal 158 at the outlet of the pump 118. The liquid state signal 158 at the outlet of the pump 118 may be indicative of gas pressure, for purpose of diagnosing pump operation, and/or gas temperature, for purpose of comparing to the heater state signal 154 downstream of the heat exchanger 122 for diagnosing the operating state of the heat exchanger 122. The rail state signal 146, filter state signal 150, heater state signal 154, liquid state signal 158, and/or other state signals indicative of the fluid state for the liquid/gaseous fuel are provided to the electronic controller 120 continuously during operation.

The electronic controller 120 includes functionality and other algorithms operating to monitor the various signals provided by system sensors and detect various failure or abnormal operating modes of the system 100 such that mitigating actions can be taken when an abnormal operating condition is present. In other words, the controller 120 includes a failure mitigation system for the DIG engine system 100 that can detect and address fuel system failures or abnormal operating modes in the fuel system, especially abnormal operating modes in the gaseous fuel system. Examples of abnormal operating modes of the system may include depletion of the LNG in the tank 114, malfunction of the gas pump 118 or its controller, clogging of any of the filters, freezing and/or clogging of the heat exchanger 122, malfunction of the pressure control module 128, and/or other malfunctions that specifically relate to the supply of the compressed gas to and from the gaseous fuel supply line 108.

During normal operation, gaseous and liquid fuel are independently injected at high pressure into engine cylinders through the fuel injector 104. A cross section of one embodiment for the injector 104 is shown installed in an engine cylinder 204 in FIG. 2 and removed from the engine in FIG. 3. Although the injector 104 shown in these figures has two checks arranged side by side, any other fuel injector design is suitable, for example, dual injectors having concentric checks or needle valves. In reference now to the figures, each engine cylinder 204 includes a bore 206, which is formed within a cylinder block 202 and slidably accepts therewithin a piston 208. As is known from typical engine applications, pistons can be connected to an engine crankshaft (not shown), which operates to provide a force tending to move each piston within the cylinder bore, for example, during a compression stroke, as well as can be moved by a force applied by the piston to rotate the crankshaft, for example, during a combustion or power stroke.

The cylinder 204 defines a variable volume 210 that, in the illustrated orientation, is laterally bound by the walls of the bore 206 and is closed at its ends by a top portion or crown of the piston 208 and by a surface 212 of the cylinder head 213, which is typically referred to as the flame deck. The variable volume 210 changes between maximum and minimum capacity as the piston 208 reciprocates within the bore 206 between bottom dead center (BDC) and top dead center (TDC) positions, respectively.

Figure 2:
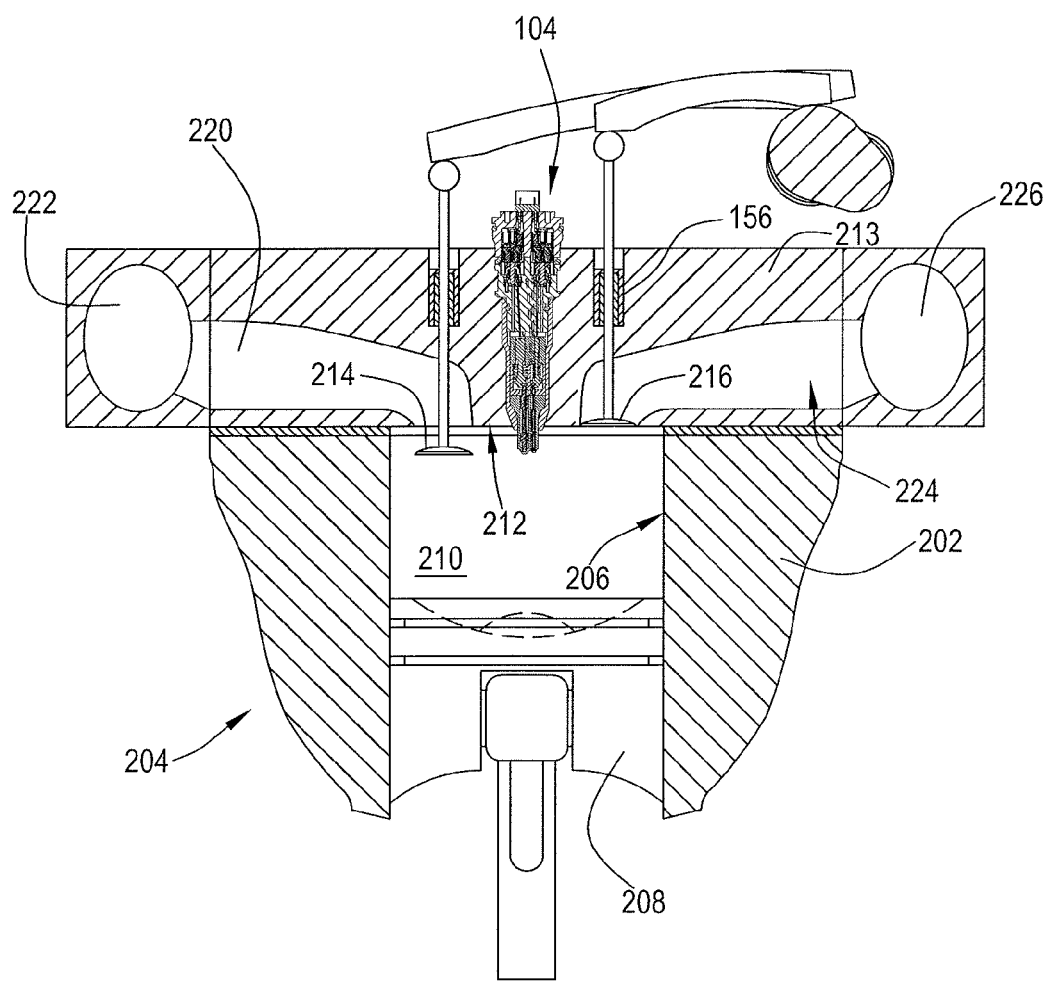
FIG. 2 is a cross section of a DIG engine cylinder in accordance with the disclosure.

In reference to FIG. 2, each cylinder 204 includes at least one intake valve 214 and at least one exhaust valve 216. It is noted that, although the cylinder 204 is illustrated in a fashion consistent with an engine operating under at least a four-stroke cycle, and thus includes cylinder intake and exhaust valves, other types of engines such as two-stroke engines are contemplated but are not specifically illustrated for brevity. In the particular engine illustrated in FIG. 2, the intake and exhaust valves 214 and 216 are selectively activated to fluidly connect the variable volume 210 with sinks and sources of fluids during operation of the engine 102. Specifically, the intake valve 214 selectively blocks an intake passage 220 that fluidly interconnects the variable volume 210 with an intake manifold 222. Similarly, the exhaust valve 216 selectively blocks an exhaust passage 224 that fluidly interconnects the variable volume 210 with an exhaust manifold 226. In the illustrated embodiment, the fuel injector 104 is disposed to selectively inject diesel and compressed natural gas (CNG) fuel directly into the variable volume 210 of each engine cylinder 204.

Figure 3:
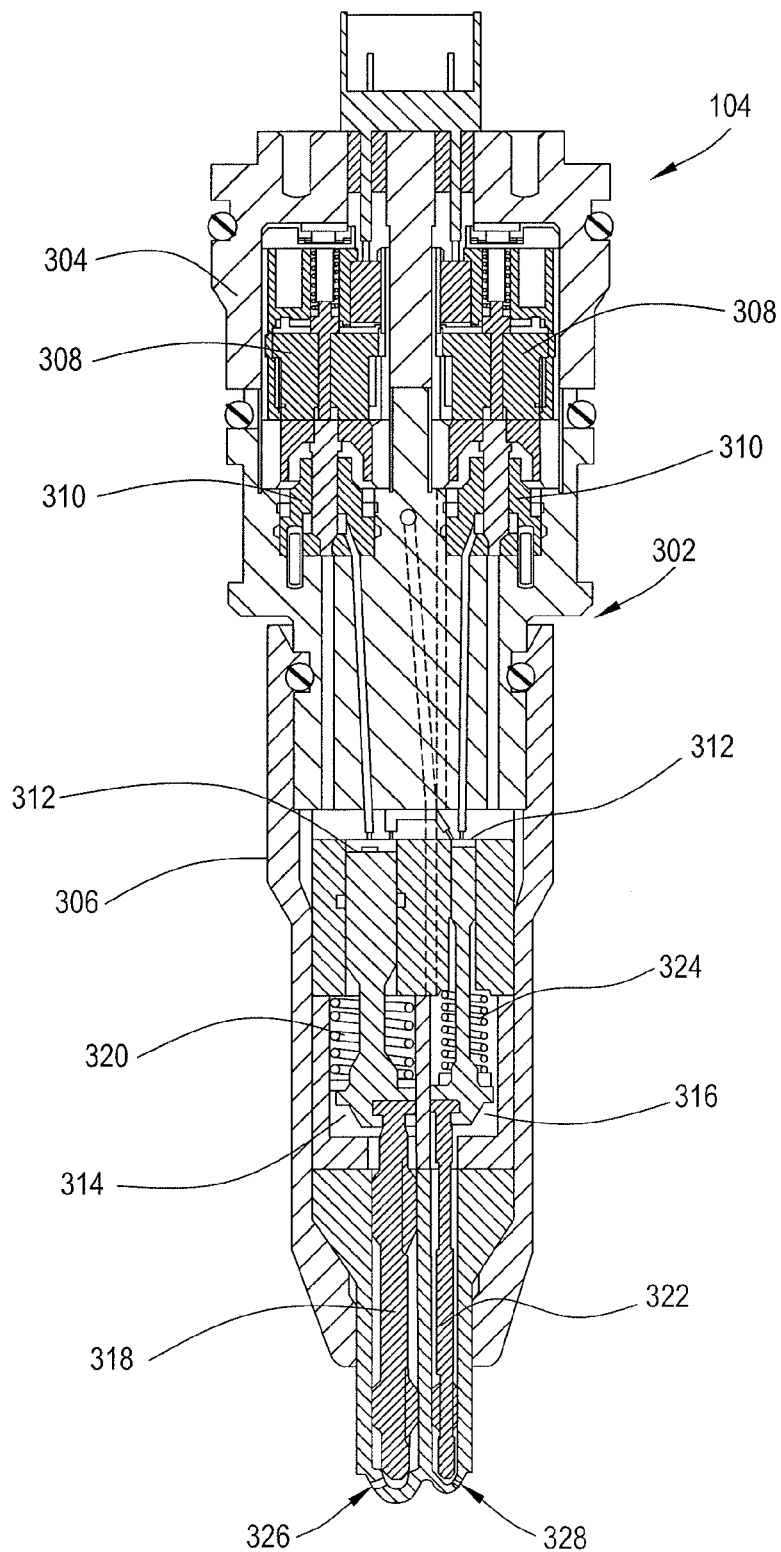
FIG. 3 is a cross section for a DIG and direct injection liquid fuel injector in accordance with the disclosure.

A cross section of the injector 104 is shown in greater detail in FIG. 3. It is noted that although a single injector that is configured to independently inject two fuels is shown herein, it is contemplated that two injectors, one corresponding to each of the two fuels, may be used instead of the single injector. Alternatively, a fuel injector having concentric needles can be used. Thus, the injector 104 represents one of numerous possible embodiments of injectors configured to independently inject two types of fuel. The specific embodiment of the injector 104 uses diesel fuel pressure to activate the check valve for injecting gaseous fuel, even though both fuels may be provided to the injector at about the same pressure, which in the illustrated embodiment is between 25 and 50 MPa.

In particular reference to the cross section shown in FIG. 3, the injector 104 includes an injector body 302 that comprises an actuator housing 304 and a needle housing 306. The actuator housing 304 forms an internal cavity that houses two electronic actuators 308. Each actuator 308 activates a respective 2-way valve 310, which selectively pressurizes or releases fluid pressure in a respective hydraulic closing chamber 312. The injector 104 further includes two fuel inlets, each fluidly connected to a respective injection chamber. More specifically, diesel fuel from the liquid fuel rail 110 (FIG. 1) is provided to a diesel injection chamber 314, while gaseous fuel from the gaseous fuel supply line 108 (FIG. 1) is provided to a gas injection chamber 316. A gas fuel needle 318 is biased by a gas closing spring 320 and by fluid pressure at the respective closing chamber 312 towards a closed position in which fluid present in the diesel injection chamber 314 is not permitted to exit the injector 104 and enter the variable volume 210 (FIG. 2). Similarly, a gas fuel needle 322 is biased by a closing spring 324 and by a hydraulic force that results by fluid pressure present in the respective closing chamber 312 towards a closed position.

When diesel or gas is injected from the injector 104, fuel is injected via dedicated nozzle openings 326 and 328 respectively, which are opened when the respective needle 318 or 322 is lifted. More specifically, when injecting diesel, a signal is provided from the electronic controller 120 (FIG. 1) to the respective actuator 308, which activates and causes the corresponding 2-way valve 310 to change position and release fluid pressure in the corresponding hydraulic closing chamber 312. When this pressure is relieved, a hydraulic pressure acting on the needle 322 overcomes the force of the closing spring 324 and permits the needle 322 to lift and permit diesel to be injected into the variable volume 210 (FIG. 1) through the diesel nozzle openings 328. Similarly, a separate command signal from the controller 120 is provided to the actuator 308 corresponding to the gaseous fuel side of the injector 104. Activation of this actuator 308 causes the corresponding 2-way valve 310 (on the left side of the illustration of FIG. 3) to change position and release diesel fluid pressure in the hydraulic closing chamber 312 corresponding to the gas injection chamber 314. When this pressure is relieved, a hydraulic/pneumatic pressure acting on the gas needle 326 overcomes the force of the closing spring 320 and permits the gas needle 318 to lift and permit gas to be injected at a high pressure directly into the variable volume 210 (FIG. 1) through the dedicated gas nozzle openings 326 of the injector 104.

In this way, the injector 104 is configured to selectively inject diesel or gas during engine operation. In the illustrated embodiment, the total fuel supply of the engine during normal operation is made up by about 5% by mass of diesel and the remaining 95% of the total fuel supply by mass of gaseous fuel. These fuels are injected at different times during engine operation. For example, diesel may be injected first while the piston 208 is moving towards the TDC position as the cylinder 204 is undergoing a compression stroke. When combustion of the diesel fuel in the variable volume is initiated or is about to initiate, the injector 104 causes the gas needle 318 to open such that gas at a high pressure is injected directly into the cylinder 204 and combust as it is ignited by the combusting diesel fuel.

When an abnormal operating condition is present that diminishes the ability of the system 100 (FIG. 1) to provide a sufficient amount of gaseous fuel to operate the engine, the controller 120 activates a limp-home mode. During the limp-home operating mode, various engine parameters are adjusted to enable engine operation on the liquid fuel under conditions that provide sufficient power to move the vehicle, into which the engine is installed, to a service location. In the illustrated embodiment, for example, the engine power while operating in limp-home mode is about 50% of total engine power such that even a fully laden vehicle travelling up an incline will be able to maintain sufficient power to dump the load and move the vehicle to a safe location.

Unlike traditional dual-fuel engines, which are normally capable of operating at full power using either of the two fuels available, the operation of certain DIG engine systems requires adjustment to enable single-fuel engine operation. Moreover, the design of certain engine components enables limp-home engine operation. In general, the diesel or liquid fuel system of a DIG engine, which typically is only called upon to provide a pilot fuel capability that ignites the gaseous fuel, is sized to permit engine operation under power provided by combustion of diesel fuel. Depending on the type and extent of malfunction of the gaseous fuel delivery system, the limp-home operating mode may be configured to use an amount of gaseous fuel that is less than what would normally be required. In instances where safety or other considerations require a complete shut-down of the gaseous fuel system, or in the case where the on-vehicle supply of gaseous fuel has been depleted, the engine is advantageously capable of providing a predetermined limp-home power while operating entirely on the liquid fuel. This functionality is accomplished both by software algorithms operating within an engine controller, as well as by various hardware capabilities of various engine components and systems.

Figure 4:
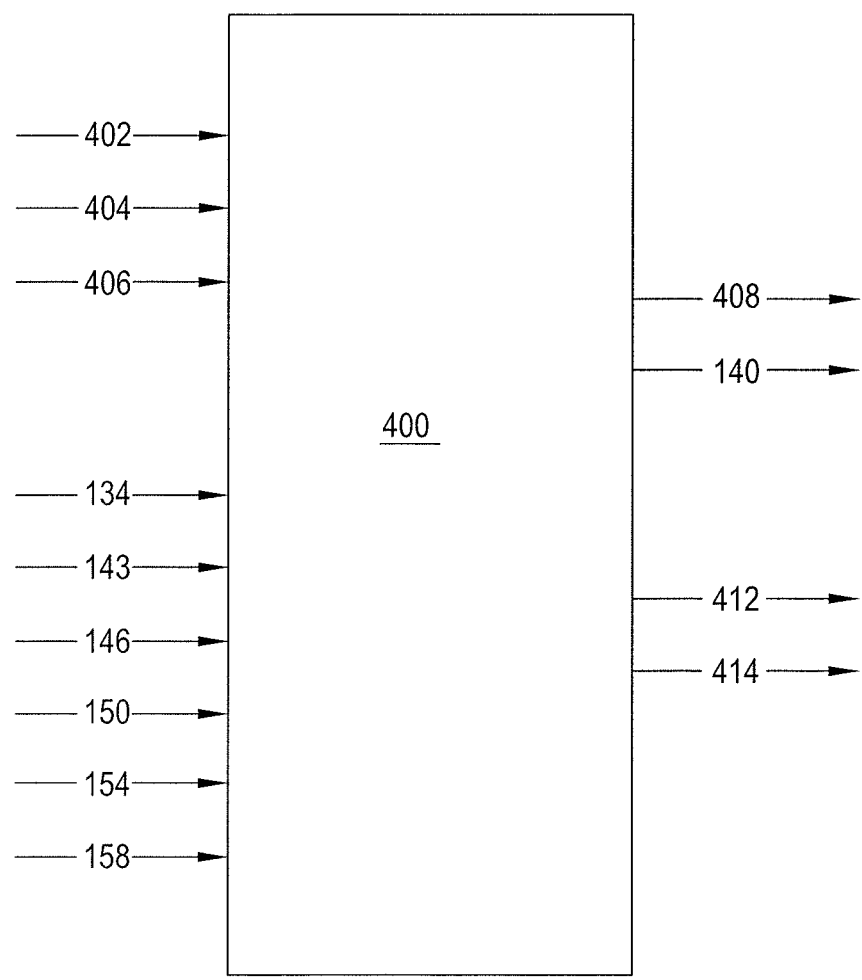
FIG. 4 is a block diagram for a controller in accordance with the disclosure.

In one aspect, an embodiment of a limp-home controller 400 is shown in FIG. 4. The controller 400 may be embodied as part of a computer having tangible storage media having computer executable instructions stored thereon that operate in a computer processor. The controller 400 may alternatively be embodied as a hardware controller or any other appropriate type of control device that operates either on-board on a vehicle or remotely.

In the illustrated embodiment, the controller 400 is disposed to receive signals from various sensors associated with the system 100 (FIG. 1), process information based on the sensor signals, and provide commands to control the operation of various components and systems of the engine 102 (FIG. 1), as appropriate. For example, the controller 400 shown in FIG. 4 is disposed to receive engine speed and load signals 402 and 404, respectively, that are indicative of desired engine operating conditions. The speed and load signals 402 and 404 may be based on operator commands or may alternatively be provided by an engine controller that controls the operation of the engine. The controller 400 further receives an engine timing signal 406, for example, provided by a crankshaft or camshaft sensor (not shown) of the engine 102 in the known fashion, which may be a separate signal or may alternatively be part of the engine speed signal 402 already discussed.

During operation, the controller 400 receives signals indicative of the operating state of the gaseous and liquid fuel delivery systems, which belong to the engine system 100, to assess the operating health of those systems and address any issues that arise. More specifically, and in parallel reference to FIG. 1, the controller 400 receives the diesel pressure signal 134, level signal 143, gas rail state signal 146, filter state signal 150, heater state signal 154, liquid state signal 158, and/or other state signals indicative of the operating state of various fuel-related components and systems of the engine system 100.

In addition to receiving information about the operating state of the engine system 100, the controller 400 is configured to provide command signals that control the operation of various fuel-related components and systems of the engine system 100. More specifically, the controller 400 provides diesel and gaseous fuel commands 408 and 410 respectively (also see FIG. 1) to the fuel injector 104. Each fuel command 408 and 410 provides an electrical signal to the respective injector actuator 308 (FIG. 3) that has a predetermined duration, during which the respective fuel is injected from the injector 104.

The controller 400 further provides signals controlling the output pressure setting setting of the diesel pump 138 and the LNG pump 118, and setting a desired pressure of the gaseous fuel through the pressure control module 128. More specifically, a diesel pump control signal 412 and a gaseous fuel pump control signal 414 are determined in the controller 400 and provided to the respective pumps to control the pressure of fuel each pump 118 and 138 provides during operation. The determinations within the controller 400 for commanding fuel injection through fuel commands 408 and 410 and pumping commands 412 and 414, in one embodiment, is based on at least one of the level signal 143 and the various other state signals 134, 146, 150, 154 and 158 previously discussed, and may be further based on the engine speed and load signals 402 and 404 to provide an operating setpoint, such that limp-home engine operation can be provided.

Figure 5:
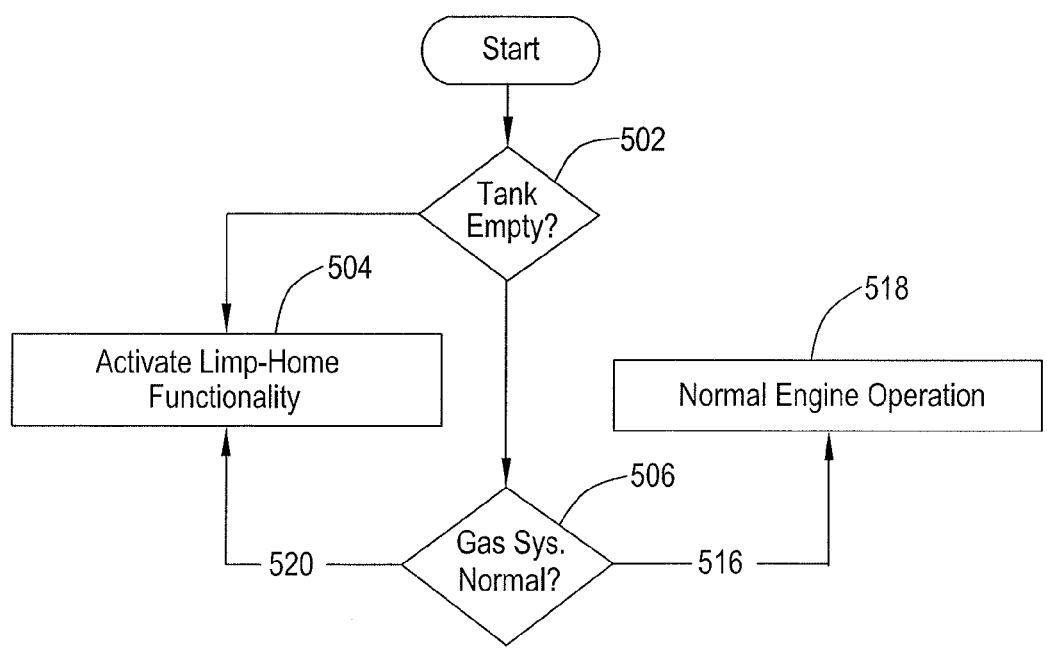
FIG. 5 is a flowchart for dual-mode system control in accordance with the disclosure.

A flowchart for a method of operation for the controller 400 is shown in FIG. 5. The method begins with a determination at 502 of whether sufficient gaseous fuel is available for engine consumption based on an indication of a level of liquefied gaseous fuel present in a holding tank. If it is determined that the tank is empty, i.e. a zero level of fuel is present, command of the engine fuel system is handed over to a limp home function at 504. When it is determined that liquefied gaseous fuel is still present in the tank at 502, a determination of whether the liquefied gas fuel delivery system is operating within acceptable parameters is carried out at 506.

Figure 6:
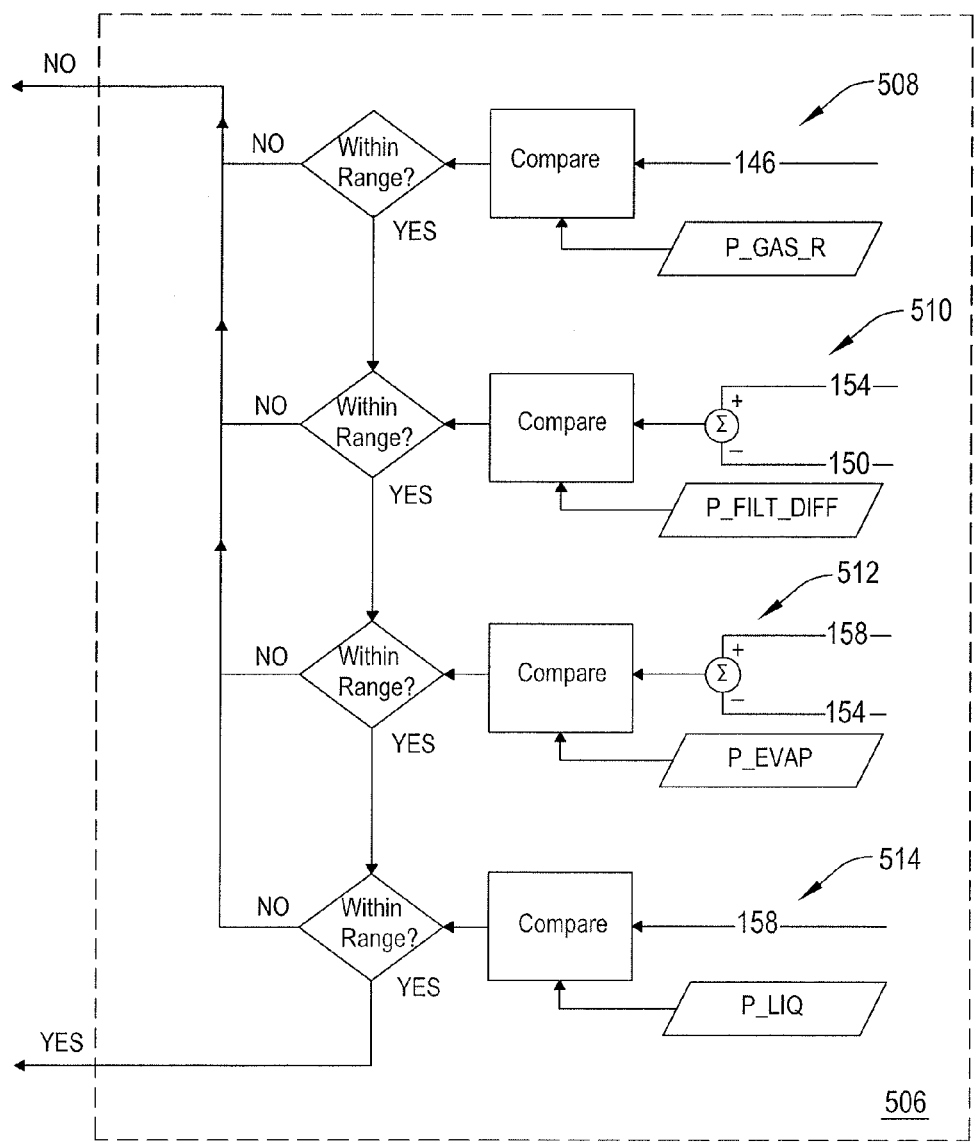
FIG. 6 is a flowchart for a method of detecting abnormal operating conditions in accordance with the disclosure.

The determination at 506 may include the monitoring and comparison of numerous operating parameters with predetermined values or ranges of values to determine that all system components are operating properly. A flowchart for the determination 506 is shown in detail in FIG. 6, and may include a comparison of the gas state 146 in the gaseous fuel supply line with a parameter indicative of the desired or commanded gaseous fuel rail state, P_GAS_R, at 508. Similarly, the function of the fuel filter 124 (FIG. 1), if present, can be determined, for example, by comparing an expected pressure difference across the filter, P_FILT_DIFF, with the pressure difference present across the filter, which in the illustrated embodiment (FIG. 1) may be inferred by the difference between the heater state signal 154 upstream of the filter with the filter state signal 150 downstream of the filter at 510. Operation of the heater can be determined by comparing the gas state, in this case, temperature, upstream and downstream of the heater based on, for example, the liquid state 158 upstream of the heater or heat exchanger 122 and the gas state 154 downstream of the heater, with a predetermined heater-related performance parameter such as a temperature increase, P_EVAP, at 512. Operation of the liquefied gas pump, for example, pump 118 (FIG. 1), can be monitored by comparing a pump outlet pressure, for example, liquid pressure 158, to a desired or expected pressure, P_LIQ, at 514. Additional checks may be conducted between each monitored state and a corresponding expected value such that a gas leak or component malfunction at any point of the system can be inferred, if present. Each of the determinations 508, 510, 512 and/or 514, which are shown to occur in sequence, can be carried out in any order and, if each determination 508, 510, 512, and 514 indicates that the respective component or system is operating normally or as expected, will produce a signal 516 that, as shown in FIG. 5, allows the engine to operate normally at 518.

When one or more abnormal operating conditions is/are detected at 508, 510, 512 and/or 514, for example, when at least one indication that the gas fuel rail pressure is low at 508, the gas filter is clogged at 510, the heater is frozen at 512, the liquefied gas pump 514 is underperforming, and/or a gas leak may be present, an abnormal operating condition 520 is provided by the determination at 506 to activate the limp home function 504. The abnormal operating condition indication 520 may be a single variable or may alternatively be one of many variables, each of which is assigned to a particular abnormal mode that was detected. For example, an indication based on a clogged filter may be different than an indication that the heater is frozen because one condition—the clogged filter—may require service or replacement of the filter, while the other condition—the frozen heater—may be rectified during operation, for example, by reducing or eliminating gas flow causing the heater to warm up.

Figure 7:
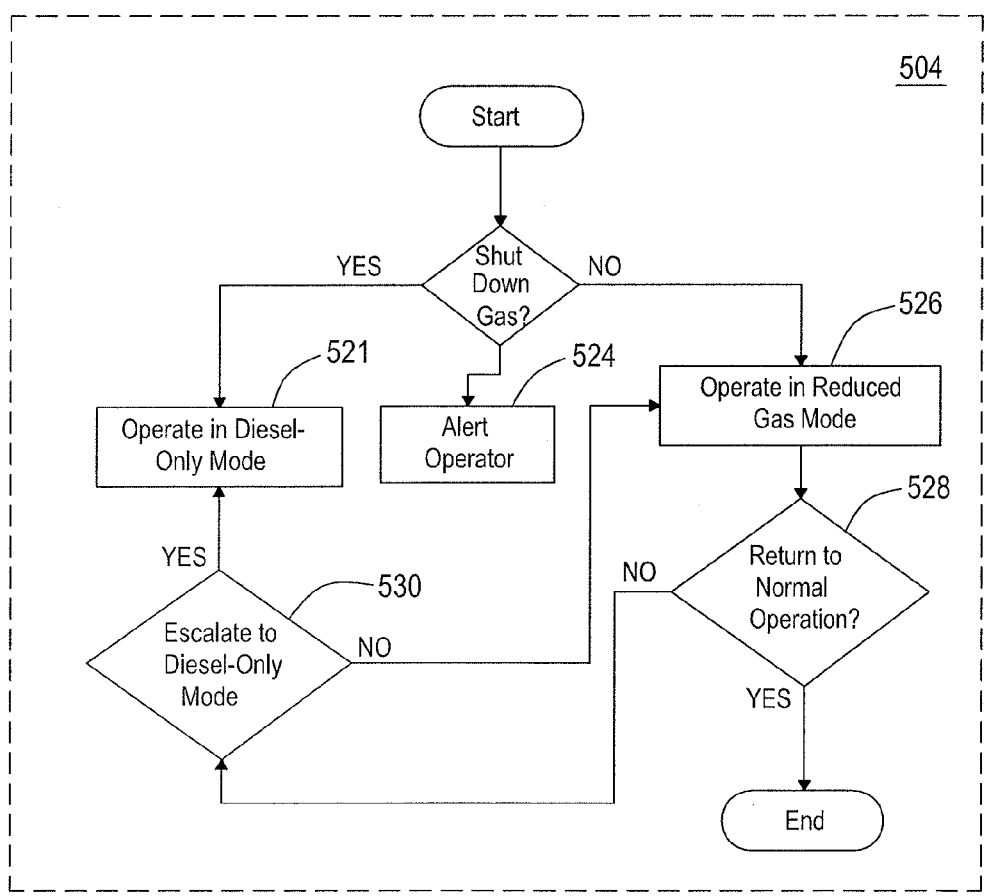
FIG. 7 is a flowchart for dual-mode operation in accordance with the disclosure.

The limp home function 504, a flowchart for which is shown in FIG. 7, is configured to provide differing degrees of emergency or abnormal operating condition functionality depending on the type of abnormal operating condition that has been detected. For example, an indication that the onboard supply of liquefied gaseous fuel has been depleted will be mitigated by shutting down the gaseous fuel supply system and operating the engine entirely on the liquid fuel. Similarly, an indication that the gaseous fuel supply system is under-performing, for example, due to icing of various components, the gaseous supply may be reduced until the situation can be corrected, for example, after the engine has warmed up. In such intermediate condition, the gaseous fuel amount used by the engine may be reduced to avoid further icing and the liquid fuel supply may be temporarily increased to offset the gaseous fuel reduction until the abnormal condition has been rectified, if possible.

In reference now to FIG. 7, the limp-home function 504 includes various lookup tables or other functions that correlate engine operating setpoint conditions with various engine control parameters based on the type of limp-home mode being implemented. For instance, when a signal indicative of depletion of liquefied fuel supply is received, emergency or limp-home engine operation is carried out entirely on diesel fuel. Alternatively, when indication is given that gaseous fuel supply at a reduced rate is possible, emergency engine operation is carried out using an increased diesel supply while still maintaining some gaseous fuel.

Accordingly, the limp-home function 504 includes a diesel-only operating mode, which is activated at 521 when conditions requiring the shut-down of the gaseous fuel supply system are present. Such conditions include, but are not limited to, depletion of the gaseous fuel supply, malfunction of the gaseous fuel pump, malfunction of the gaseous fuel pressure regulator, as previously discussed, as well as other types of malfunctions, such as a failure in one or more fuel injectors and the like. When operation in any emergency operating mode is present, a visual, audible, and/or haptic indication is also provided to the operator to inform the operator of the abnormal operating condition and the need for service at 524. While the engine operates in diesel-only mode, the various command signals 408, 410, 412 and 414 (FIG. 4) may be adjusted accordingly to disable the gaseous fuel supply and adjust engine operating parameters to enable diesel-only operation.

For example, when operating on diesel or liquid fuel only mode, the pressure in the liquid fuel rail 110 of the engine may be increased to allow a larger fuel amount to be injected in the cylinder, and/or the injection duration may be increased for the same reason. In the illustrated embodiment, the pressure in the liquid fuel rail 110 may be increased from about 35 MPa that is present during normal operation to about 100 MPa during emergency operation. Similarly, the injection duration of the diesel or liquid fuel portion of the injector can be increased according to the amount of fuel required to provide the desired emergency engine power to cover 40 or more degrees of crankshaft rotation. When operating in a diesel-only mode, the engine may be configured to provide sufficient power to move the vehicle under the worst possible contemplated conditions. For example, a fully loaded mining truck travelling up an inclined road may require about 50% of normal engine power output capacity to operate in emergency or limp-home mode. Such operation can provide limited functionality to provide the machine with the ability to continue functioning to a certain extent until it can be serviced. The limp-home mode engine output can be selected based on the requirements of a particular engine application. In the controller 400, for example, the percentage of rated engine output that can be made available during the limp-home mode may be set by an appropriate variable that can be adjusted depending on the engine application up to a maximum power limp-home engine power output level.

When operating in an emergency or limp-home mode while still maintaining a reduced supply of gaseous fuel to the engine, the limp-home function 504 further includes an diesel/reduced gas emergency operating mode, which is activated at 526. When operating in the emergency operating mode, the monitoring of the condition of the system continues and, depending on the type of abnormal condition that is present, a determination is made at 528 on whether to return the engine to normal operation if the conditions enabling the emergency operation are no longer present. Similarly, a determination is made at 530 on whether to escalate the emergency operation into the diesel-only operating mode 521, for example, if additional enabling conditions present themselves and/or the original enabling conditions have not been rectified after a predetermined period.

INDUSTRIAL APPLICABILITY

The present disclosure is applicable to DIG engines having a gaseous fuel system operating with a liquid fuel system, which is used to provide liquid fuel that ignites the gaseous fuel. In the illustrated embodiment, both fuels are injected directly into each engine cylinder using a dual-check fuel injector. Various sensors are disposed to monitor components and systems of the engine for proper operation, and indications are generated within a controller associated with the system of abnormal operating conditions. When abnormal operating conditions are present, the controller determines the severity of the abnormal condition and adjusts operation of the engine to change to ratio at which the two fuels are supplied. For example, while under normal operation the liquid fuel is primarily used to ignite the gaseous fuel, in an emergency or limp-home operating mode, the liquid fuel is used to provide engine power that displaces or replaces power normally provided by the gaseous fuel.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

We claim:

1. A direct injection gas engine system, comprising:
an engine having at least one cylinder that forms a variable volume between a reciprocating piston, a bore, and a flame deck;
a liquid fuel system that includes a liquid fuel rail in fluid communication with a liquid fuel injector, the liquid fuel injector configured to inject liquid fuel directly into the variable volume as an ignition source;
a gaseous fuel system that includes a gaseous fuel injector, the gaseous fuel injector configured to inject gaseous fuel directly into the variable volume as a power source;
a controller disposed to monitor and control operation of the engine in a normal mode or in a limp-home mode, the normal mode being present when abnormal operating conditions are absent, and the limp-home mode being present when the controller determines that abnormal operating conditions are present, such that:

when operating in the normal mode, a normal amount of liquid fuel and a normal amount of gaseous fuel are injected into the cylinder to produce a rated engine power, and when operating in the limp-home mode, an amount of liquid fuel that is larger than the normal amount of liquid fuel and an amount of gaseous fuel that is less than the normal amount of gaseous fuel are injected into the cylinder to produce a limp-home engine power that is less than the rated power;

wherein the liquid fuel system includes a liquid fuel pump configured to draw liquid fuel from a liquid fuel reservoir and provide pressurized liquid fuel to a liquid fuel rail that is fluidly connected to the liquid fuel injector, the pressurized liquid fuel being pressurized to a rail pressure;

wherein the gaseous fuel system includes a cryogenic tank configured to store the gaseous fuel in a liquid state, and a gaseous fuel supply line in fluid communication with the gaseous fuel injector;

wherein the gaseous fuel system further comprises a gaseous fuel pump configured to draw liquefied gaseous fuel from the cryogenic tank and provide compressed liquefied gaseous fuel to a heater, the heater configured to increase a temperature of the liquefied gaseous fuel; and a pressure control module disposed between the heater and the gaseous fuel supply line, the pressure control module configured to control a pressure of the gaseous fuel.

2. The engine system of claim 1, wherein the liquid fuel and gaseous fuel are sequentially injected into the cylinder.

3. The engine system of claim 1, wherein the pressure of the gaseous fuel and the rail pressure of the compressed liquid fuel are about equal when the engine system is operating in the normal mode.

4. The engine system of claim 1, further comprising at least one of:

a gas state sensor disposed between the gaseous fuel supply line and the pressure control module, the gas state sensor configured to provide a rail state signal indicative of a state of the compressed liquid fuel to the controller;

a fuel filter state sensor disposed between the fuel filter and the pressure control module, the fuel filter state sensor configured to provide a filter state signal indicative of a filtered gaseous fuel state to the controller;

a heater state sensor disposed between the fuel filter and the heater, the heater state sensor configured to provide a heater state signal indicative of a gaseous fuel state to the controller;

a liquid state sensor disposed at an outlet of the gaseous fuel pump and configured to provide a liquid state signal indicative of a compressed gaseous fuel state to the controller; and a level sensor associated with the cryogenic tank and configured to provide a level signal indicative of a level of the gaseous fuel in the liquid state within the cryogenic tank to the controller.

5. The engine system of claim 4, wherein the controller is configured to monitor one or more of the rail state, filter state, heater state, liquid state and level signals to determine the presence of abnormal operating conditions, and to shift engine operation from the normal mode to the limp-home mode when one or more abnormal operating conditions are present.

6. A failure mitigation system for a direct injection gas engine that uses a diesel pilot to ignite a directly injected gaseous fuel such as liquefied petroleum or natural gas that is stored in a cryogenic tank and is heated in a heater for use in an engine, the failure mitigation system operating in a controller associated with the DIG engine, comprising:

at least one engine cylinder that forms a variable volume between a piston disposed within a bore, a portion of the bore, and a flame deck;

a diesel fuel system that includes a diesel fuel rail in fluid communication with a diesel fuel injector, the diesel fuel injector configured to inject diesel fuel directly into the variable volume as an ignition source;

a gaseous fuel system that includes a gaseous fuel injector, the gaseous fuel injector configured to inject gaseous fuel directly into the variable volume as a power source;

wherein the controller is disposed to monitor and control operation of the engine in a normal mode or in a limp-home mode, the normal mode being present when abnormal operating conditions are absent, and the limp-home mode being present when the controller determines that abnormal operating conditions are present, such that:

when operating in the normal mode, a normal amount of diesel fuel and a normal amount of gaseous fuel are injected into the cylinder to produce a rated engine power, and when operating in the limp-home mode, an amount of diesel fuel that is larger than the normal amount of diesel fuel and an amount of gaseous fuel that is less than the normal amount of gaseous fuel are injected into the cylinder to produce a limp-home engine power that is less than the rated power;

wherein the gaseous fuel system further comprises a gaseous fuel pump configured to draw liquefied gaseous fuel from the cryogenic tank and provide compressed liquefied gaseous fuel to a heater, the heater configured to increase a temperature of the liquefied gaseous fuel such that the liquefied gaseous fuel approaches a supercritical gas state, and a fuel filter disposed to filter the gaseous fuel in the supercritical gas state; and a gaseous fuel supply line in fluid communication with the gaseous fuel injector, and a pressure control module disposed between the heater and the gaseous fuel supply line, the pressure control module configured to control a pressure of the gaseous fuel provided to the gaseous fuel injector.

7. The failure mitigation system of claim 6, wherein the diesel fuel system includes a diesel fuel pump configured to draw diesel fuel from a reservoir and provide pressurized diesel fuel to the diesel fuel rail that is fluidly connected to the diesel fuel injector, the pressurized diesel fuel being pressurized to a rail pressure.

8. The failure mitigation system of claim 6, wherein the pressure of the gaseous fuel and the rail pressure of the diesel fuel are about equal when the engine system is operating in the normal mode.

9. The engine system of claim 6, further comprising at least one of:

a gas state sensor disposed between the gaseous fuel supply line and the pressure control module, the gas state sensor configured to provide a state signal indicative of a fuel state to the controller;

a fuel filter state sensor disposed between the fuel filter and the pressure control module, the fuel filter state sensor configured to provide a filter state signal indicative of a state of filtered gaseous fuel to the controller;

a heater state sensor disposed between the fuel filter and the heater, the heater state sensor configured to provide a heater state signal indicative of a gaseous fuel state pressure to the controller;

a liquid state sensor disposed at an outlet of the gaseous fuel pump and configured to provide a liquid state signal indicative of a compressed gaseous fuel state to the controller; and a level sensor associated with the cryogenic tank and configured to provide a level signal indicative of a level of the gaseous fuel in the liquid state within the cryogenic tank to the controller.

10. The failure mitigation system of claim 9, wherein the controller is configured to monitor one or more of the state at the supply line, filter state, heater state, liquid state and level signals to determine the presence of abnormal operating conditions, and to shift engine operation from the normal mode to the limp-home mode when one or more abnormal operating conditions are present.

11. The failure mitigation system of claim 6, wherein the diesel fuel injector and the gaseous fuel injector are integrated into a single injector having first and second check valves, each of which corresponds to respective first and second actuators that are independently activatable, each of the first and second actuator being associated with a valve that, when activated, causes the first check valve corresponding to the first actuator or the second check valve corresponding to the second actuator to open such that diesel fuel is injected when the first check valve is open and gaseous fuel is injected when the second check valve is open.

12. A method for mitigating gaseous fuel system failures or abnormal operating conditions in a direct injection gas engine, comprising:

operating a gaseous fuel supply system that includes a storage tank adapted to store a gaseous fuel in a cryogenically liquefied state, a gas pump adapted to draw gaseous fuel from the storage tank and compress it to produce compressed gaseous fuel, a heater adapted to increase an enthalpy of the compressed gaseous fuel, and a gaseous fuel supply line adapted to provide the compressed gaseous fuel;

monitoring, in a controller, sensor signals indicative of operating conditions of the gaseous fuel supply, the sensor signals including at least one of a state signal, which is indicative of a state of the compressed gaseous fuel in the gaseous fuel supply line, a heater state signal, which is indicative of a gaseous fuel state at an outlet of the heater, a liquid state signal, which is indicative of a gaseous fuel state at an inlet of the heater, and a level signal, which is indicative of a level of the gaseous fuel in the cryogenically liquefied state within the storage tank;

determining in the controller that an abnormal operating condition is present based on the monitoring of at least one of the rail state signal, the heater state signal, the liquid state signal and the level signal; and shifting engine operation by use of the controller from a normal mode to a limp-home mode when the abnormal operating condition is present;

wherein, when operating in the normal mode, a normal amount of a liquid fuel and a normal amount of the gaseous fuel are injected into an engine cylinder to produce a rated engine power, and when operating in the limp-home mode, an amount of liquid fuel that is larger than the normal amount of liquid fuel and an amount of gaseous fuel that is less than the normal amount of gaseous fuel are injected into the engine cylinder to produce a limp-home engine power that is less than the rated power.

13. The method of claim 12, further comprising controlling the pressure of the compressed gaseous fuel at the outlet of the heater such that a controlled pressure of gaseous fuel is provided at the gaseous fuel supply line.

14. The method of claim 12, wherein shifting engine operation from the normal mode to the limp-home mode includes increasing a pressure of the liquid fuel and increasing an injection duration of a liquid fuel injector to compensate for the reduction in the amount of gaseous fuel injecting into the engine cylinder.

* * * * *